(12) United States Patent
Wilkinson

(10) Patent No.: US 8,860,557 B2
(45) Date of Patent: Oct. 14, 2014

(54) METHOD AND APPARATUS TO FACILITATE SETTING RFID TAGS TO A PARTICULAR READ STATE

(75) Inventor: Bruce W. Wilkinson, Rogers, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 162 days.

(21) Appl. No.: 13/193,479

(22) Filed: Jul. 28, 2011

(65) Prior Publication Data

US 2013/0027191 A1 Jan. 31, 2013

(51) Int. Cl.
*H04Q 5/22* (2006.01)
*G06K 7/10* (2006.01)

(52) U.S. Cl.
CPC .................. *G06K 7/10009* (2013.01)
USPC ...... 340/10.6; 340/10.42; 340/572.1

(58) Field of Classification Search
USPC ................................ 340/10.1–10.6
See application file for complete search history.

(56) References Cited

U.S. PATENT DOCUMENTS

| | | | |
|---|---|---|---|
| 2006/0044112 A1* | 3/2006 | Bridgelall | 340/10.1 |
| 2006/0087436 A1* | 4/2006 | Reddy et al. | 340/572.3 |
| 2006/0109122 A1* | 5/2006 | Deeds | 340/572.1 |
| 2006/0132312 A1* | 6/2006 | Tavormina | 340/572.7 |
| 2008/0001725 A1* | 1/2008 | White et al. | 340/10.51 |
| 2008/0198903 A1* | 8/2008 | Kawai | 375/135 |
| 2010/0097195 A1* | 4/2010 | Majoros et al. | 340/10.6 |
| 2010/0109844 A1* | 5/2010 | Carrick et al. | 340/10.1 |
| 2010/0109851 A1* | 5/2010 | Burbridge et al. | 340/10.42 |
| 2010/0207739 A1* | 8/2010 | Smith et al. | 340/10.4 |

OTHER PUBLICATIONS

"EPC™ Radio-Frequency Identity Protocols Class-1 Generation-2 UHF RFID Protocol for Communications at 860 MHz-960 MHz Version 1.0.9;" Specification for RFID Air Interface by EPCglobal Inc.; 94 pages, Jan. 2005.

* cited by examiner

*Primary Examiner* — John A Tweel, Jr.

(74) *Attorney, Agent, or Firm* — Fitch, Even, Tabin & Flannery, LLP

(57) ABSTRACT

A wireless transmitter is configured to transmit compatibly to RFID tags and a control circuit operably couples to that wireless transmitter and is configured to use the wireless transmitter to transmit to those RFID tags a message to cause the RFID tags to have a particular read state without also soliciting a corresponding response from any of those RFID tags. For example, this can comprise causing RFID tags having a B inventory state to switch to an A inventory state (while permitting RFID tags already having an A inventory state to so remain).

23 Claims, 2 Drawing Sheets

METHOD AND APPARATUS TO FACILITATE SETTING RFID TAGS TO A PARTICULAR READ STATE

TECHNICAL FIELD

This invention relates generally to Radio-Frequency Identification (RFID) tags and more particularly to RFID-tag read states.

BACKGROUND

RFID tags are known in the art. RFID tags are typically small circuits that are configured to respond to a radio-frequency (RF) signal with a corresponding data transmission. A device configured to transmit such an RF signal and to receive that responsive data transmission is often referred to as a reader. Some RFID tags are self-powered while others are passive in that they rely upon the received RF signal for their operating power (and some RFID tags are a hybrid of these two approaches).

Many times the RFID tag's data includes information, such as an identifier, that is unique (at least to some extent) to that particular responding RFID tag. The Electronic Product Code (EPC) as managed by EPCGlobal, Inc., for example, represents one such effort in these regards. EPC-based RFID tags each have an utterly-unique serial number (within the EPC system) to thereby uniquely identify each tag and, by association, each item associated on a one-for-one basis with such tags. (The corresponding document entitled EPC Radio-Frequency Identity Protocols Class-1 Generation-2 UHF RFID Protocol for Communications at 860 MHz-960 MHz Version 1.0.9 (often referred to as "EPC GEN2") is hereby fully incorporated herein by this reference.)

At least some RFID-tag protocols permit an RFID tag to have any of a plurality of read states. The aforementioned EPC GEN2 approach, for example, provides for a so-called A inventory state, a B inventory state, and a selected flag (SL) state (pursuant to which an RFID tag is visible to all interrogation sessions). This permits, for example, a group of RFID tags to be inventoried without necessarily requiring each and every RFID tag to respond to the reader. A reader can be configured, for example, to request that RFID tags having an A inventory state respond to a read request while permitting RFID tags having a B inventory state to essentially ignore the read request.

Presently-proposed RFID tag-based systems that employ such approaches meet a wide variety of application requirements and needs. That said, the applicants have determined that not all potential needs are fully met by these presently-proposed approaches.

BRIEF DESCRIPTION OF THE DRAWINGS

The above needs are at least partially met through provision of the method and apparatus to facilitate setting RFID tags to a particular read state described in the following detailed description, particularly when studied in conjunction with the drawings, wherein.

Figure 1:
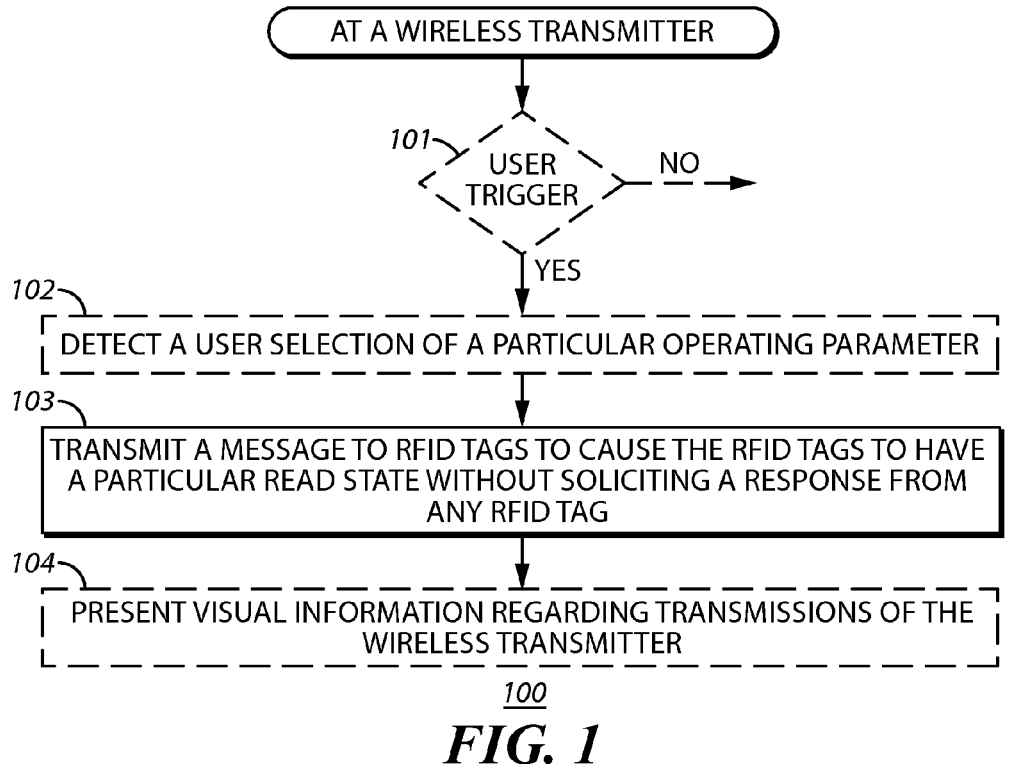
FIG. 1 comprises a flow diagram as configured in accordance with various embodiments of the invention.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a useful apparatus can comprise a wireless transmitter that is configured to transmit compatibly to RFID tags and a control circuit that operably couples to that wireless transmitter and that is configured to use the wireless transmitter to transmit to those RFID tags a message to cause the RFID tags to have a particular read state without also soliciting a corresponding response from any of those RFID tags. For example, this can comprise causing RFID tags having a B inventory state to switch to an A inventory state (while permitting RFID tags already having an A inventory state to so remain).

That this occurs in the absence of a corresponding RFID tag read request from this apparatus of course varies considerably from prior art practice in these regards. Generally speaking, prior art readers that transmit a change-inventory-state message will follow up (typically essentially immediately) with a read request. This approach permits the prior art reader to successfully read RFID tags that were switched, say, from a B inventory state to the A inventory state.

The applicant, however, has determined that such an approach can offer numerous advantages and benefits. Such an apparatus, for example, can work in cooperation with another apparatus that in fact serves as a reader and that might, for example, prompt RFID tags that just switched to a new read state as per the foregoing message to now respond to a read request for RFID tags having that particular read state. Such an approach, for example, permits only a relatively small area to be exposed to the described message. This, in turn, can facilitate relatively well-targeted read-state settings as compared to the coverage of a wide-area reader.

The form factor and/or application setting to implement these teachings can vary considerably as desired. By one approach, the apparatus can comprise a hand-held portable gun-like device. By another approach, the apparatus can operate in conjunction with, for example, a glove. By yet another approach the apparatus can be installed in conjunction with a receptacle (such as a wheeled cart or the like) or a fixed location that comprises a portal through which various RFID tags will typically pass.

These teachings can be economically employed and will accommodate use of transmit-only platforms as well as fully-capable readers as desired. These teachings are highly flexible in practice and can be readily scaled to accommodate a wide variety and scope of application settings.

These and other benefits may become clearer upon making a thorough review and study of the following detailed description. Referring now to the drawings, and in particular to FIG. 1, an illustrative process 100 that is compatible with many of these teachings will now be presented. It shall be understood that these teachings are not to be viewed as being limited by the specifics of these examples. Also, for the sake of illustration the depicted RFID tags are assumed to comprise passive RFID tags. It shall be understood, however, that these approaches can be applied in conjunction with other architectural approaches as well including so-called active tags and hybrid tags that combine active and passive methodologies.

Figure 2:
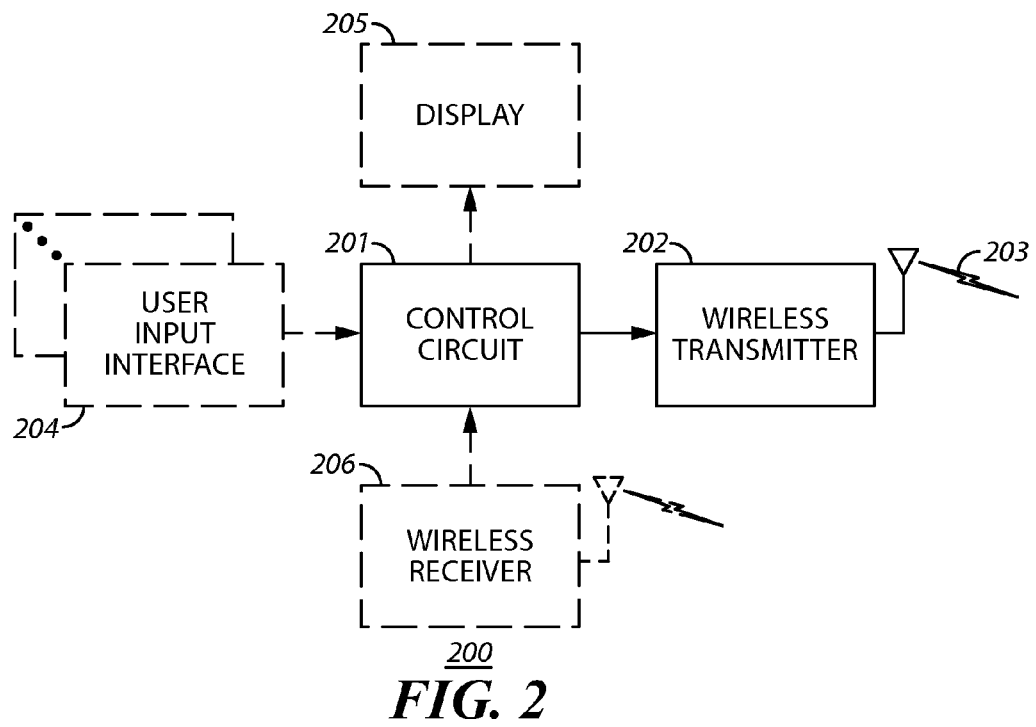
FIG. 2 comprises a block diagram as configured in accordance with various embodiments of the invention.

The description of this process 100 presumes the use of an apparatus that includes a wireless transmitter. Referring momentarily to FIG. 2, this apparatus 200 can comprise, for example, a control circuit 201 that operably couples to a wireless transmitter 202. This control circuit 201 can comprise a partially or wholly programmable platform as are known in the art or a dedicated purpose platform as may be desired for some applications. This control circuit 201 is configured (for example, by the use of corresponding programming when the control circuit 201 comprises a programmable platform) to carry out one or more of the steps, actions, or functions described herein.

The wireless transmitter 202 is configured to transmit compatibly to RFID tags of choice. This can comprise, for example, transmitting messages 203 using a carrier frequency (or frequencies) and signaling protocol/data format that are compatible with the specifications of the aforementioned EPC GEN2 standard. By one approach this wireless transmitter 202 comprises a frequency-hopping wireless transmitter.

These teachings will optionally accommodate including one or more user input interfaces 204 that operably couple to the control circuit 201. This can include, for example, providing one or more user-responsive triggers or other control surfaces (such as, but not limited to, buttons, switches, keys, cursor-control devices, and/or touch-screen displays) that permit an end user to communicate particular instructions to the apparatus 200.

These teachings will also optionally accommodate including one or more displays 205 that operably couple to the control circuit 201. This display 205 can be as simple as one or a few discrete light sources (such as light-emitting diodes) or as complex as a full-color touch-screen display as desired.

And, if desired, these teachings will also accommodate optionally including a wireless transceiver 206 that operably couples to the control circuit 201. By one approach this wireless receiver 206 can be configured to receive messages from RFID tags. By another approach this wireless receiver 206 can be configured to receive operating instructions from another transmitter (not shown). As already noted, such a wireless receiver 206 is optional; these teachings will readily support use of an apparatus 200 that completely lacks any ability to receive wireless transmissions (or in particular to read RFID tag responses).

The form factor for this apparatus 200 can vary considerably. Various examples in these regards appear further below.

Referring again to FIG. 1, at optional step 101 this process 100 will accommodate detecting when a user asserts a trigger. This trigger, for example, can comprise the aforementioned user input interface 204. In the absence of detecting such an assertion this process 100 will accommodate any of a variety of immediate responses. This can include, for example, simply looping back and continuing, unabated, to monitor for a trigger assertion. This can also include paying at least momentary attention to other processes and only looping back from time to time to determine whether the user has asserted the trigger. It is also possible that the control circuit 201 is configured to respond to such a trigger as a real-time interrupt. These and other approaches in such regards are well known in the art and require no further elaboration here.

In any event, this process will also accommodate the optional step 102 of detecting whether a user selects a particular operating parameter such as, but not limited to, a particular RFID tag session state. Note, for example, that the EPC GEN2 standard defines and will accommodate any of a variety of sessions for a given RFID tag (these being denoted as session 0, session 1, session 2, and so forth). These sessions are essentially independent from one another and read states can be independently established for each such session. For example, a reader can interrogate a given RFID tag using session 3 in which case read states can be set in that particular session but not, for example, for session 1 or session 2 sessions. By permitting the apparatus 200 to take note of a particular session selection, for example, the read-state settings contemplated herein can be specific to a particular session type if desired.

In any event, at step 103 this process provides for transmitting a message to RFID tags to cause those RFID tags to have a particular read state without also then soliciting a response from any such RFID tag. This can comprise transmitting this message only a single time. These teachings will readily accommodate, however, transmitting this message (or very similar, substantively-related messages) a plurality of times as desired. The latter might comprise, for example, transmitting the message once each second for, say, five consecutive seconds.

As a specific, non-limiting example in these regards, the particular read state can comprise a read sate as specified by the EPC GEN2 standard and hence may comprise any of an A inventory state, a B inventory state, and a selected flag (SL) state as desired. In such a case, the message can include an EPC GEN2 standard-compatible instruction that instructs receiving B inventory state-RFID tags to switch from the B inventory state to the A inventory state. It will be understood that other possibilities can be similarly supported. As a simple example, the message can instruct A inventory state RFID tags to switch to the B inventory state.

By one approach this message can further target or specify only RFID tags that presently observe or constitute a particular session state. This could comprise, for example, only instructing RFID tags that are session 2 RFID tags (again presuming an EPC GEN2-compatible application setting) and that are presently non-A inventory state RFID tags to switch to the A inventory state. If desired, this session specificity can represent a fixed operating parameter. As noted earlier, however, these teachings will accommodate optionally permitting a user to select a particular operating parameter such as a particular RFID tag session state. In such a case, then, the session specified by the user can direct (or at least influence) the session specificity of the aforementioned message.

As noted, this step 103 of causing RFID tags to have a particular read state occurs in the operational absence of soliciting a response from these RFID tags. In the case where the enabling apparatus has no reception capability this occurs as an operational necessity. Even in the case, however, where the enabling apparatus has compatible reception capability this process 100 occurs without prompting a read response from any of these RFID tags. Accordingly, the enabling apparatus does nothing, for example, to prompt an RFID tag to respond by way of transmitting, at least in part, the RFID tag's identifier information.

The aforementioned operational absence, by one approach, refers to not reading RFID tags (via the apparatus) for at least five minutes. By another approach this operational absence refers to not reading RFID tags for at least ten minutes. Other time frames can suffice depending upon the application and ranging, for example, from about five minutes to "forever."

If desired, this process 100 will also accommodate the optional step 104 of presenting visual information regarding the aforementioned transmissions of the wireless transmitter (using, for example, the aforementioned display 205). This can comprise, for example, providing text or icons/signals that indicate that a message (or group of messages) has been (or is being) transmitted. This presentation can include, if desired, other information such as any default or user-selected operating parameters (such as particular RFID tag session states and/or the read state into which the message places receiving RFID tags). When the enabling apparatus will support a mode of operation that continuously transmits the aforementioned message, the presentation can include an indication of that mode of operation. Other possibly-useful information to present includes, but is not limited to, remaining battery power, a (default or user-selected) transmission power setting (and/or a corresponding effective transmission range), and so forth.

Figure 3:
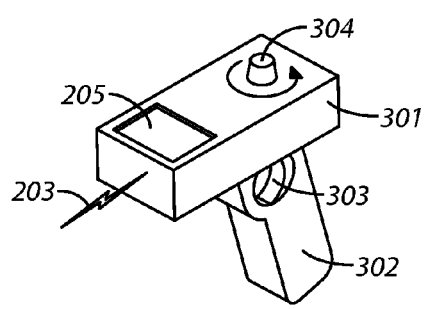
FIG. 3 comprises a perspective view as configured in accordance with various embodiments of the invention.

As mentioned earlier, such an apparatus 200 can assume any of a variety of form factors. As shown in FIG. 3, and by way of one example, the apparatus 200 can comprise a pistol-like form factor housing 301 having a handle 302 and a trigger 303 to permit the user to cause the apparatus to transmit the aforementioned message 203. In addition to a display 205 this version of the apparatus as illustrated also includes a rotating switch 304 that permits the user to select one or more operating parameters for the apparatus (such as, for example, a particular RFID tag session state).

Figure 4:
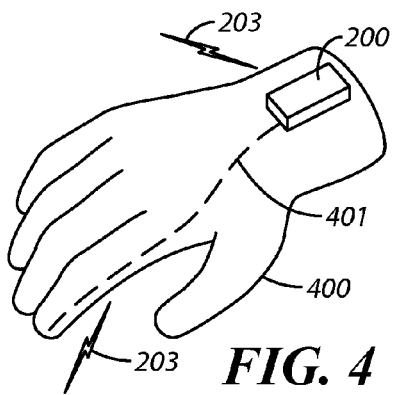
FIG. 4 comprises a perspective view as configured in accordance with various embodiments of the invention.

FIG. 4 illustrates another approach for the enabling apparatus 200. In this example the apparatus 200 has a glove-based form factor 400 that receives the hand of the user. The aforementioned message 203 can be broadcast directly from a small housing for the wireless transmitter and/or from one or more antennas 401 that are disposed, for example, within or atop the fabric or material that comprises the glove itself.

Such a glove could be worn, for example, by an associate who is engaged in stocking a shelf or display with various RFID tag-bearing items or who is otherwise inspecting, arranging, or straightening up such items. In such a case the apparatus 200 may transmit the messages using a relatively low power setting. In this case the effective range of the apparatus 200 will be quite limited (for example, to only a few inches if desired). In such an application setting it is likely that only RFID tags that are quite close to the handling of the associate will receive the message and switch to the instructed read state. A corresponding reader (not shown) can then read those particular tags as they switch to the instructed state with the concurrent understanding that these read RFID tags are likely those receiving the attention and ministrations of the glove-wearing associate.

Figure 5:
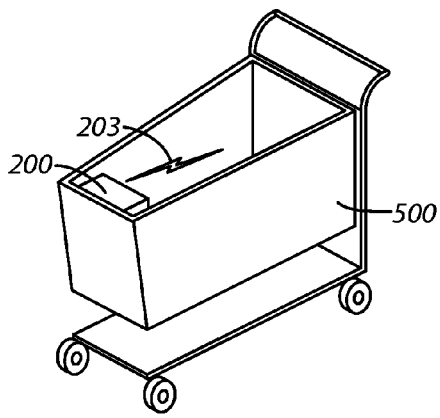
FIG. 5 comprises a perspective view as configured in accordance with various embodiments of the invention.

FIG. 5 presents yet another illustrative example in these regards. In this example the apparatus 200 is installed in conjunction with a receptacle 500 (such as a wheeled receptacle like a shopping cart as found in many retail shopping establishments). In this case the message 203 from the apparatus 200 can be powered and aimed to essentially include, at least for the most part, RFID tags that are located within the receptacle 500. This, in turn, can facilitate an automated check-out process where the RFID tags for the customer's selections in the receptacle 500 are switched to an A inventory state and then promptly read by an A inventory-state reader to calculate the amount owed by the customer.

Figure 6:
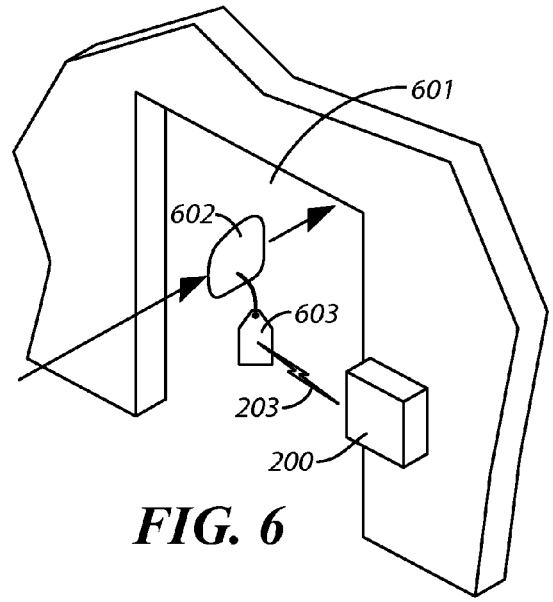
FIG. 6 comprises a perspective view as configured in accordance with various embodiments of the invention.
Figure 7:
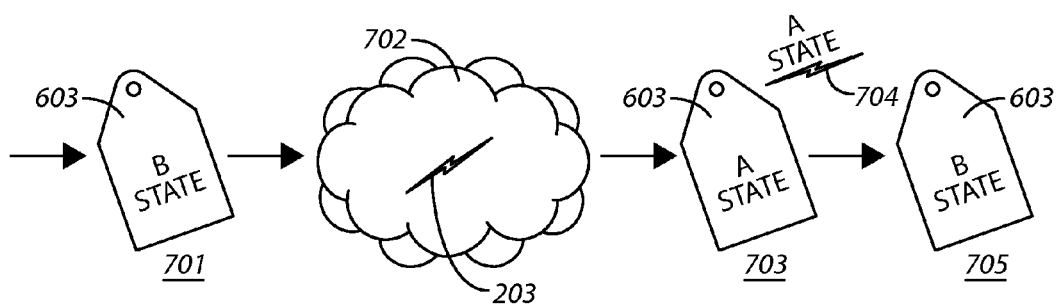
FIG. 7 comprises a schematic view as configured in accordance with various embodiments of the invention.

And FIGS. 6 and 7 illustrate yet another example in these regards. In this example the apparatus 200 is installed at a fixed location at a portal 601 (which portal 601 can be disposed proximal to, for example, a point-of-sale station or between a backroom storage area and a retail display area). So configured, items 602 bearing corresponding RFID tags 603 that pass through the portal 601 will have their read states set accordingly (when their read states are not already so set).

FIG. 7 illustrates this scenario. A given RFID tag 603 having a B inventory state approaches the portal (as indicated by reference numeral 701) and eventually passes through the coverage zone 702 for the apparatus 200 where the aforementioned message 203 can be reliably received. In this case, the message 203 will cause the RFID tag 603 to switch from its B inventory state to the A inventory state (as indicated by reference numeral 703). This A inventory-state RFID tag 603 is then readable by (and read by) an A inventory state reader transmission 704. After responding to that read inquiry the RFID tag 603 then again switches back automatically to the B inventory state (as indicated by reference numeral 705) per the usual programming and behavior of this particular RFID tag 603.

These teachings can be employed in a variety of useful ways. In an application setting where most (if not all) RFID tag reading occurs via fixed-location readers, the apparatus described herein provides a relatively inexpensive and flexible way to supplement the functionality of those readers by selectively instructing RFID tags within the range of the apparatus to have a read state that will correspond to the reading settings of the fixed-location readers. Such a capability has value in any of a variety of locations and operational settings.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

As one example in these regards, the aforementioned apparatus can be configured to also transmit a read transmission to RFID tags that have been switched to a particular read state albeit without an ability to read those corresponding responses. The responses of those RFID tags to such a read transmission could instead be received and read by another reader in the area. While normally the device transmitting the RF to RFID tags has the intelligence to construct a select command according to a corresponding read protocol (such as the EPC Gen2 protocol), this apparatus could be completely "dumb." Although this apparatus can transmit a radio-frequency sequence that the tag would understand as a "select" command, the apparatus itself can otherwise completely lack, for example, EPC Gen2 intelligence.

As another example in these regards, such an apparatus can be configured to automatically identify and determine the session(s) that are currently being employed to interrogate a relevant population of RFID tags. So informed, this apparatus can then be configured to automatically instruct the RFID tags to change their read state in that session only. Such an apparatus could be configured, for example, to issue multiple select commands. By way of illustration this apparatus may send out a signal that tags understand as a change from B to A inventory state for session 2 and another select command to change the A inventory state to B in session 3. This could be done in an alternating sequence.

I claim:

1. An apparatus for use with radio-frequency identification (RFID) tags having selectively changeable read states, the apparatus comprising:
    a wireless transmitter configured to transmit compatibly to the RFID tags;
    a control circuit operably coupled to the wireless transmitter and configured to use the wireless transmitter to transmit to the RFID tags a message to cause the RFID tags to have a particular read state without soliciting a response from any RFID tag, wherein the particular read state specifies, at least in part, whether to respond to a read request.

2. The apparatus of claim 1 wherein the apparatus lacks any ability to read the RFID tag responses.

3. The apparatus of claim 1 wherein the apparatus comprises a hand-held apparatus.

4. The apparatus of claim 3 wherein the apparatus has, at least in part, a glove-based form factor.

5. The apparatus of claim 1 further comprising:
    a user-responsive trigger that operably couples to the control circuit and to which the control circuit responds by using the wireless transmitter to transmit to the RFID tags the message to cause the RFID tags to have a particular read state.

6. The apparatus of claim 1 further comprising:
    a display operably coupled to the control circuit; and wherein the control circuit is further configured to use the display to present visual information regarding transmissions of the wireless transmitter.

7. The apparatus of claim 1 further comprising:
    a user-input interface operably coupled to the control circuit to permit an end user to select an operating parameter for the apparatus.

8. The apparatus of claim 7 wherein the operating parameter comprises a selection of a particular RFID tag session state.

9. The apparatus of claim 1 wherein the particular read state comprises an Electronic Product Code (EPC) Radio-Frequency Identity Protocols Class-1 Generation-2 Ultra-High Frequency (UHF) RFID Protocol for Communications at 860 MHz-960 MHz Version 1.0.9-based read state.

10. The apparatus of claim 9 wherein the particular read state consists of one from the group comprising an A inventory state, a B inventory state, and a selected flag (SL) state.

11. The apparatus of claim 1 wherein the wireless transmitter comprises a frequency-hopping wireless transmitter.

12. The apparatus of claim 1 wherein transmitting the message comprises transmitting the message a single time in response to a single transmission instruction.

13. The apparatus of claim 1 further comprising:
    an apparatus RFID tag having an identifier that correlates to the apparatus and wherein the apparatus RFID tag is responsive to the message.

14. A method for use with radio-frequency identification (RFID) tags having selectively changeable read states, the method comprising: at a control circuit:
    using a wireless transmitter to transmit to the RFID tags a message to cause the RFID tags to have a particular read state without soliciting a response from any RFID tag, wherein the particular read state specifies, at least in part, whether to respond to a read request.

15. The method of claim 14 further comprising:
    detecting user assertion of a trigger;
    and wherein using the wireless transmitter to transmit the message comprises using the wireless transmitter to transmit the message in response to detecting the user assertion of the trigger.

16. The method of claim 14 further comprising:
    using a display to present visual information regarding transmissions of the wireless transmitter.

17. The method of claim 14 further comprising:
    detecting a user selection of a particular operating parameter; and wherein using the wireless transmitter to transmit the message comprises modifying the message as a function of the particular operating parameter.

18. The method of claim 17 wherein the particular operating parameter comprises a selection of a particular RFID tag session state.

19. The method of claim 14 wherein using a wireless transmitter to transmit the message comprises using a wireless transmitter that is installed at a fixed location.

20. The method of claim 19 wherein the fixed location comprises a portal.

21. The method of claim 20 wherein the portal comprises a portal that is disposed at least proximal to a point-of-sale station.

22. The method of claim 14 wherein using a wireless transmitter to transmit the message comprises using a wireless transmitter that is installed in conjunction with a receptacle that holds the RFID tags.

23. The method of claim 22 wherein the receptacle comprises a wheeled receptacle.

\* \* \* \* \*